United States Patent
Trombley et al.

(10) Patent No.: US 12,344,180 B1
(45) Date of Patent: Jul. 1, 2025

(54) SEAT ASSEMBLY

(71) Applicant: Lear Corporation, Southfield, MI (US)

(72) Inventors: Mark D. Trombley, Macomb, MI (US); Alejandro O. Cordoba, Clarkston, MI (US); Michael Corvino, Canton, MI (US); Robert Elliott, Pune (IN); Mayur Manohar Faye, Pune (IN); Michael Ferrari, St. Clair Shores, MI (US); Vito Francesco Mannino, Sterling Heights, MI (US); Kiran Mandhare, Pune (IN); Owen S. Middleton, Troy, MI (US); Luke Schmidt, Southfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 18/796,551

(22) Filed: Aug. 7, 2024

(51) Int. Cl.
*B60R 21/207* (2006.01)
*B60R 21/215* (2011.01)
*B60R 21/16* (2006.01)

(52) U.S. Cl.
CPC .......... *B60R 21/207* (2013.01); *B60R 21/215* (2013.01); *B60R 2021/161* (2013.01)

(58) Field of Classification Search
CPC ............... B60R 21/207; B60R 21/215; B60R 2021/161
See application file for complete search history.

(56) References Cited

U.S. PATENT DOCUMENTS

| | | | |
|---|---|---|---|
| 6,991,279 B2 | 1/2006 | Sweers | |
| 8,876,154 B2 | 11/2014 | Tracht | |
| 9,566,930 B2 * | 2/2017 | Line | B60N 2/6009 |
| 9,834,166 B1 | 12/2017 | Line | |
| 9,914,378 B1 | 3/2018 | Line | |
| 9,914,421 B2 * | 3/2018 | Line | B60R 21/207 |
| 9,932,012 B1 * | 4/2018 | Line | B60N 2/6009 |
| 10,011,204 B2 | 7/2018 | Line | |
| 10,166,895 B2 | 1/2019 | Line | |
| 10,518,735 B2 * | 12/2019 | Kondrad | B60N 2/5816 |
| 10,773,616 B2 | 9/2020 | Wlassuk | |
| 10,821,929 B2 * | 11/2020 | Kondrad | B60R 21/23138 |
| 11,325,507 B2 | 5/2022 | Kang | |
| 11,325,515 B2 | 5/2022 | Hallock | |
| 11,364,829 B2 * | 6/2022 | Berry | B60N 2/68 |
| 11,458,924 B2 * | 10/2022 | Muehlenbrock | B60R 21/207 |
| 11,554,741 B2 * | 1/2023 | Bhagatkar | B60R 21/23138 |
| 2005/0248189 A1 | 11/2005 | Prasatek | |
| 2013/0320742 A1 * | 12/2013 | Murolo | B60N 2/682 264/279 |
| 2017/0313223 A1 | 11/2017 | Tomita | |
| 2019/0023216 A1 | 1/2019 | Sayed | |
| 2019/0225180 A1 * | 7/2019 | Kondrad | B60N 2/6018 |
| 2024/0123880 A1 | 4/2024 | Arai | |

* cited by examiner

*Primary Examiner* — Faye M Fleming

(74) *Attorney, Agent, or Firm* — McGarry Bair PC

(57) ABSTRACT

A seat assembly, comprising a seat back comprising: a cushion; a back panel assembly, including: a substrate panel; an outer panel coupled to the substrate panel via a plurality of protrusions of at least one of the outer panel or the substrate panel; a retainer coupled to the substrate panel and the outer panel; a trim cover engaged with the back panel assembly and covering at least a portion of the cushion; and an airbag disposed at least partially between the outer panel and the trim cover; wherein the retainer is configured to limit movement of the outer panel during deployment of the airbag.

20 Claims, 15 Drawing Sheets

SEAT ASSEMBLY

TECHNICAL FIELD

The present disclosure generally relates to seat assemblies, including seat assemblies that can, for example, be utilized in connection with vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
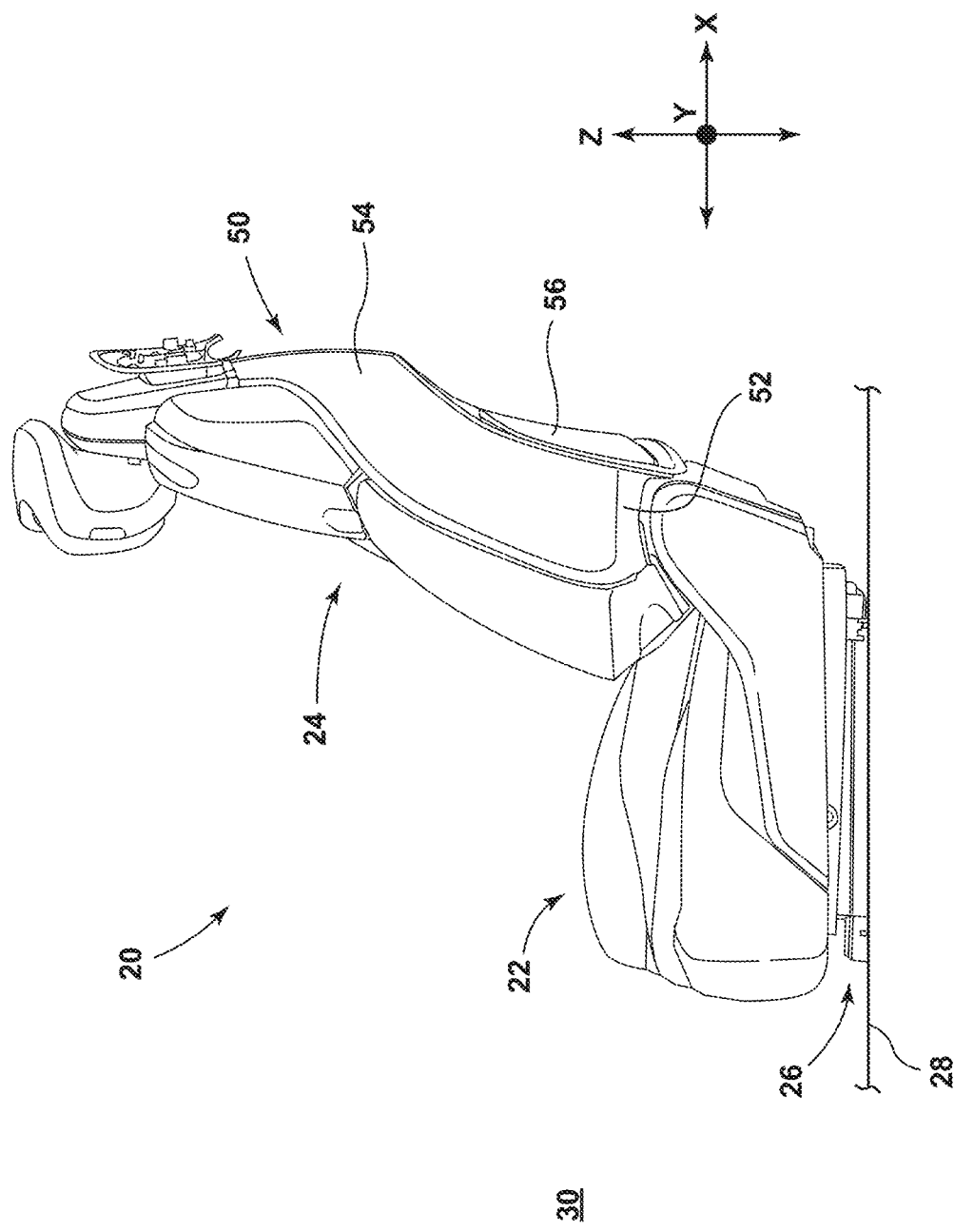
FIG. 1 is a side view generally illustrating an embodiment of a seat assembly according to teachings of the present disclosure.
Figure 2:
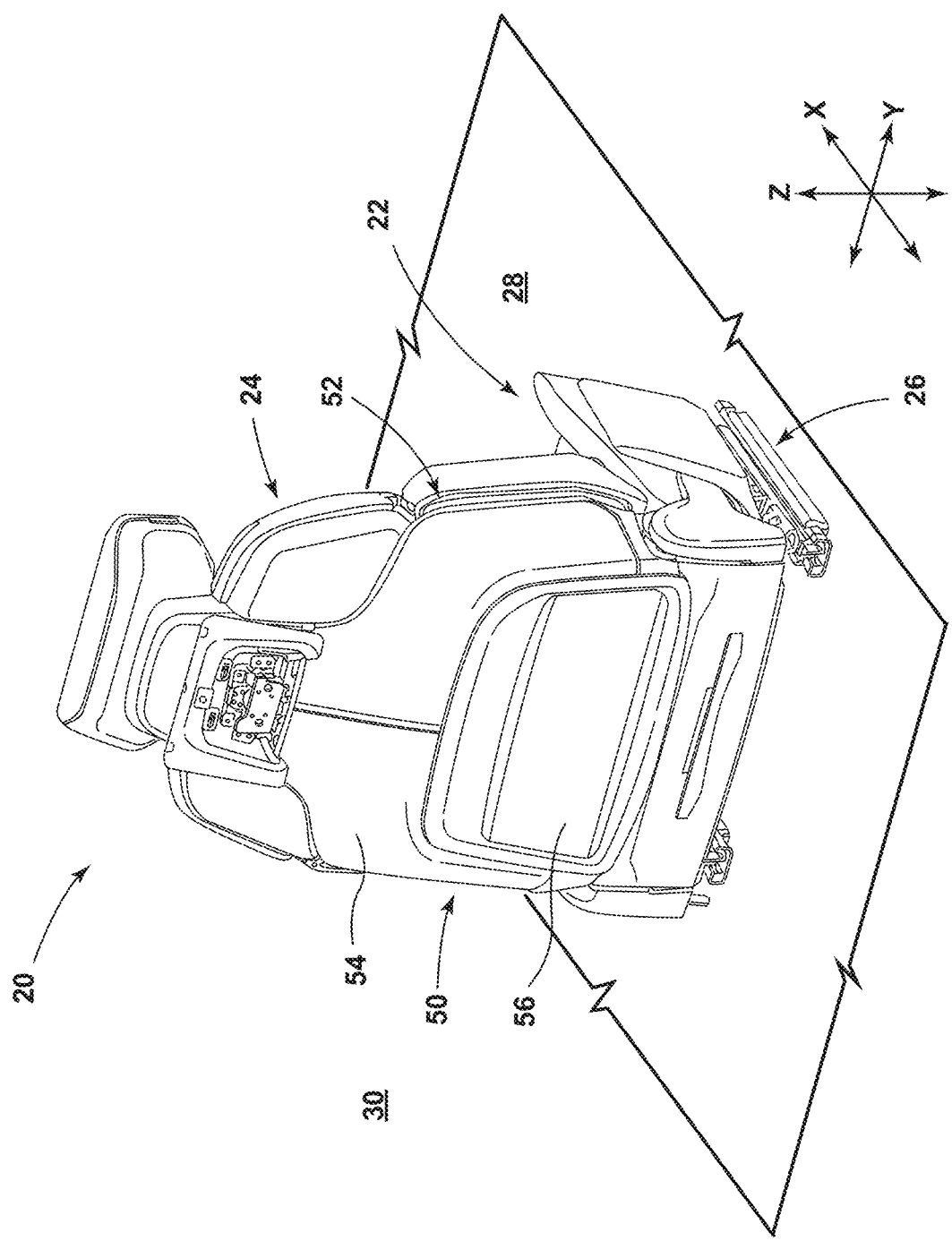
FIG. 2 is a rear perspective view generally illustrating an embodiment of a seat assembly according to teachings of the present disclosure.

Referring to FIGS. 1 and 2, a seat assembly 20 includes a seat base 22 and a seat back 24 coupled to the seat base 22. The seat assembly 20 optionally includes a track assembly 26 slidably mounting the seat base 22 and the seat back 24 to a mounting surface 28. The seat assembly 20 is shown as part of a vehicle 30 (e.g., a passenger car, pickup truck, among others), but can be utilized in other applications. The seat back 24 includes a back panel assembly 50 including a substrate panel 52, an outer panel 54 coupled to the substrate panel 52, and a map pocket 56 coupled to at least one of the substrate panel 52 or the outer panel 54. The seat assembly 20 defines a longitudinal direction X, a transverse direction Y, and a vertical direction Z. The outer panel 54 can, for example, be a decorative panel that includes one or more different materials than the substrate panel 52, such as engineered wood veneers, carbon fiber inlays, and/or metal inlays, and with open pour and/or high-gloss finishes.

Figure 3:
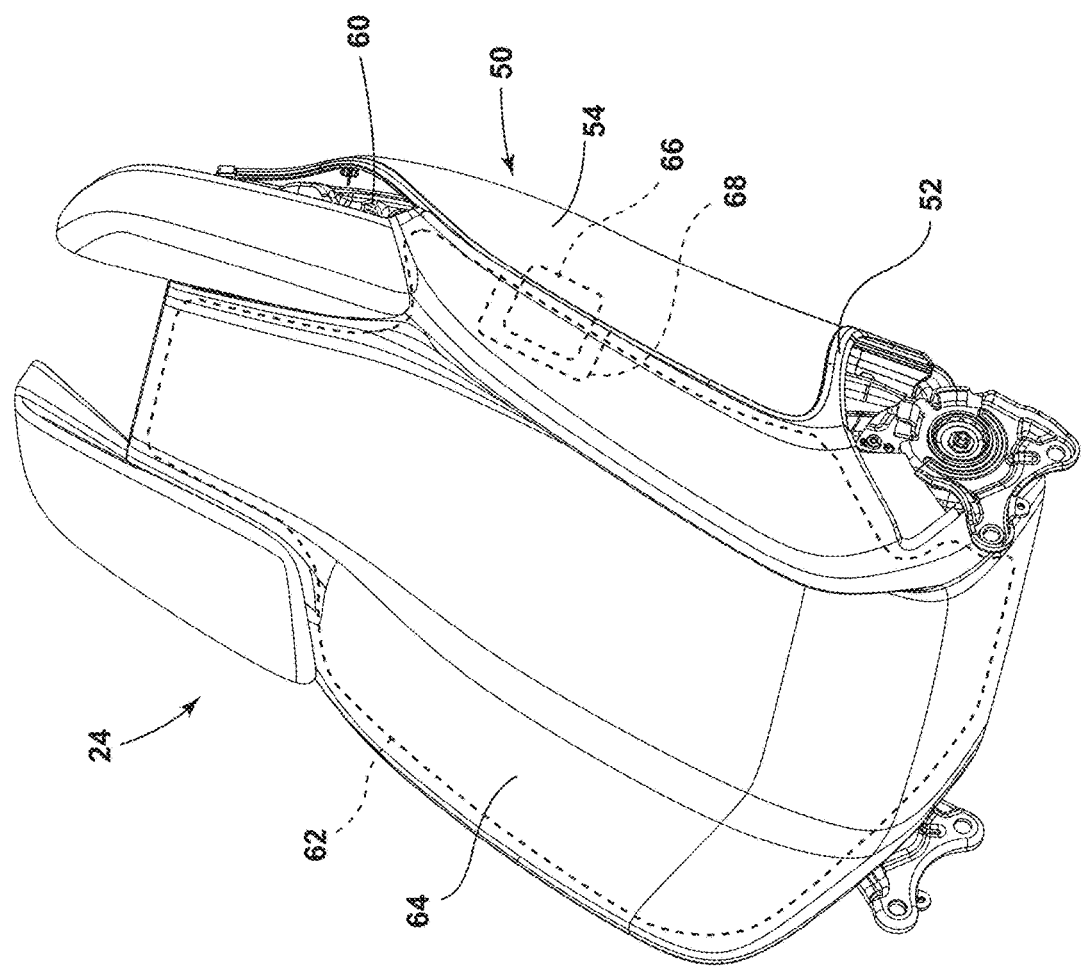
FIG. 3 is a front perspective view generally illustrating an embodiment of a seat back of a seat assembly according to teachings of the present disclosure.

Referring to FIG. 3, the seat back 24 includes the back panel assembly 50, a seat back frame 60, a cushion 62, a trim cover 64, and an airbag 66. The back panel assembly 50 and the cushion 62 and are coupled to the seat back frame 60. For example, the substrate panel 52 is coupled to seat back frame 60, and the outer panel 54 and the map pocket 56 (FIG. 2) are coupled to the seat back frame 60 via the substrate panel 52. The trim cover 64 covers at least a portion of the cushion 62. For example, the trim cover 64 extends around and covers the outer surfaces of the cushion 62, and serves as the front surface of the seat back 24. The trim cover 64 is coupled with the back panel assembly 50. The airbag 66 is disposed at least partially between (i) the substrate panel 52 and/or the outer panel 54 and (ii) the cushion 62 and/or the trim cover 64. The airbag 66 is illustrated as a side impact airbag (SIAB), but can include other configurations. The trim cover 64 includes a breakaway section 68 through which the airbag 66 is configured to deploy. The breakaway section 68 is disposed at least partially at or adjacent to an intersection of the trim cover 64 with the back panel assembly 50. For example, the breakaway section 68 can include a portion of the trim cover 64 configured to rip during deployment of the airbag 66 and/or can include a portion of the trim cover 64 configured to disengage from the back panel assembly 50 during deployment of the airbag 66.

Figure 4:
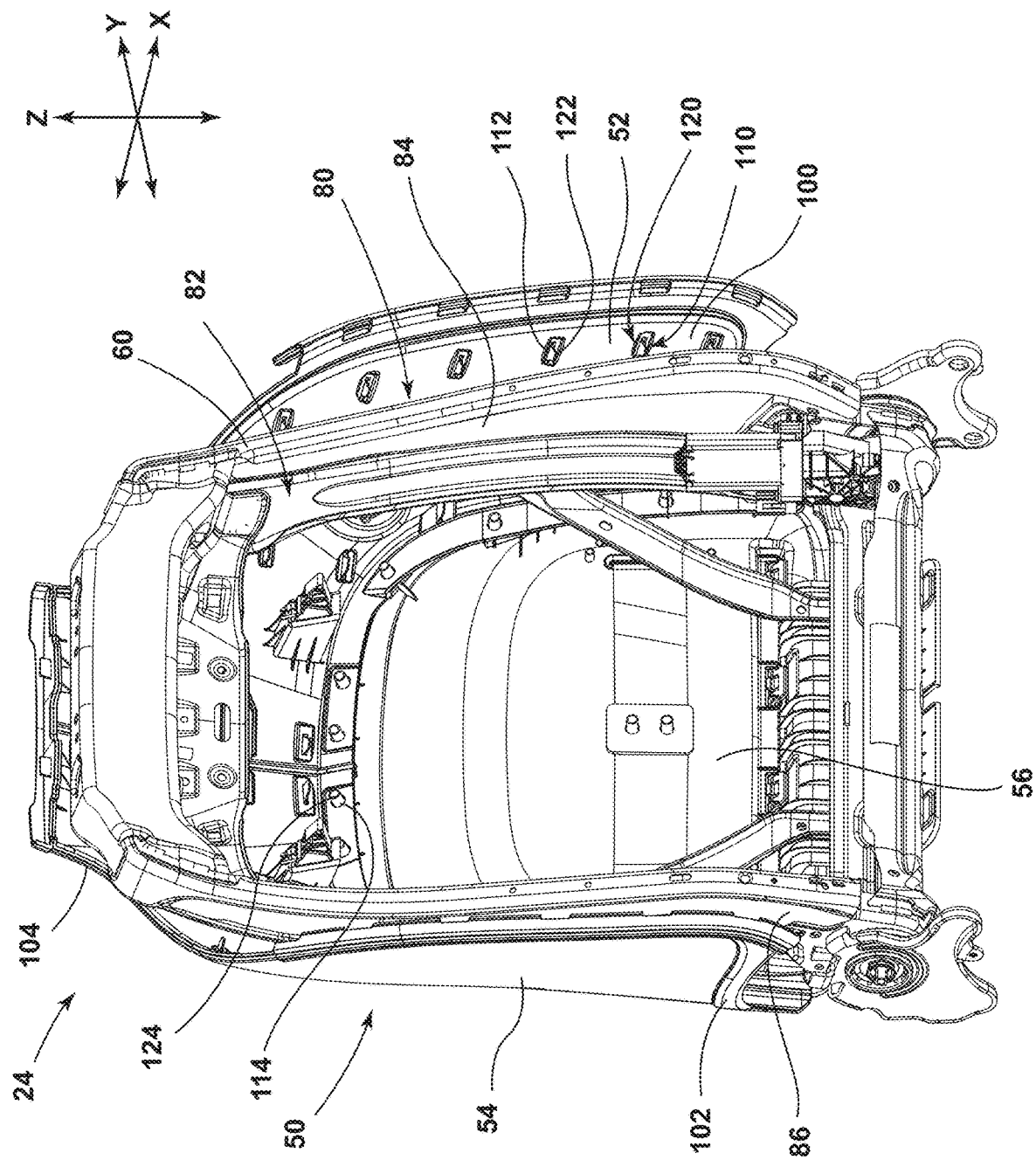
FIG. 4 is a front perspective view generally illustrating portions of an embodiment of a seat back of a seat assembly according to teachings of the present disclosure.

Referring to FIG. 4, the seat back frame 60 includes a front 80, a rear 82, a first side 84, and a second side 86. In the illustrated example, the first side 84 is an outboard side that is closer to an outer wall of the vehicle 30 (FIG. 1) than the second side 86. The back panel assembly 50 is disposed at the rear 82 and extends forward along at least a portion of the first side 84 and the second side 86. For example, at least portions of the substrate panel 52 and the outer panel 54 extend along a portion of the first side 84 and the second side 86 such that the substrate panel 52, the outer panel 54, the first side 84, and the second side 86 partially overlap in the transverse direction Y.

The substrate panel 52 includes a first leg 100, a second leg 102, and a middle section 104 connecting the first leg 100 and the second leg 102. The first leg 100, the second leg 102, and the middle section 104 are disposed in a U-shaped configuration that opens downward, but can include other configurations. In the illustrated configuration, the first leg 100 is an outboard leg disposed closer to an outer wall of the vehicle 30 (FIG. 1) than the second leg 102. The first leg 100 and the second leg 102 include curved configurations for extending from the rear 82 of the seat back frame 60 to the first and second sides 84, 86, respectively, of the seat back frame 60.

The substrate panel 52 includes a plurality of apertures 110 disposed at the first leg 100, the second leg 102, and the middle section 104. The apertures 110 are configured to receive protrusions of at least one of the outer panel 54 or the map pocket 56. For example, the apertures include tab apertures 112 and stake apertures 114. The tab apertures 112 are configured to receive protrusions 120 of the outer panel 54, such as weld tabs 122, to couple the outer panel 54 with the substrate panel 52. The tab apertures 112 are illustrated as elongated slots, but can include other configurations. The stake apertures 114 are configured to receive protrusions of the map pocket 56, such as heat stakes 124, to couple the map pocket 56 with the substrate panel 52. While the outer panel 54 is illustrated with the protrusions 120 and the substrate panel 52 is illustrated with the tab apertures 112, the opposite configuration, or a combination of configurations can be utilized. For example, at least one of the substrate panel 52 or the outer panel 54 includes the plurality of protrusions 120 and at least the other of the substrate panel 52 or the outer panel 54 includes corresponding apertures 110, such as tab apertures 112.

Figure 5:
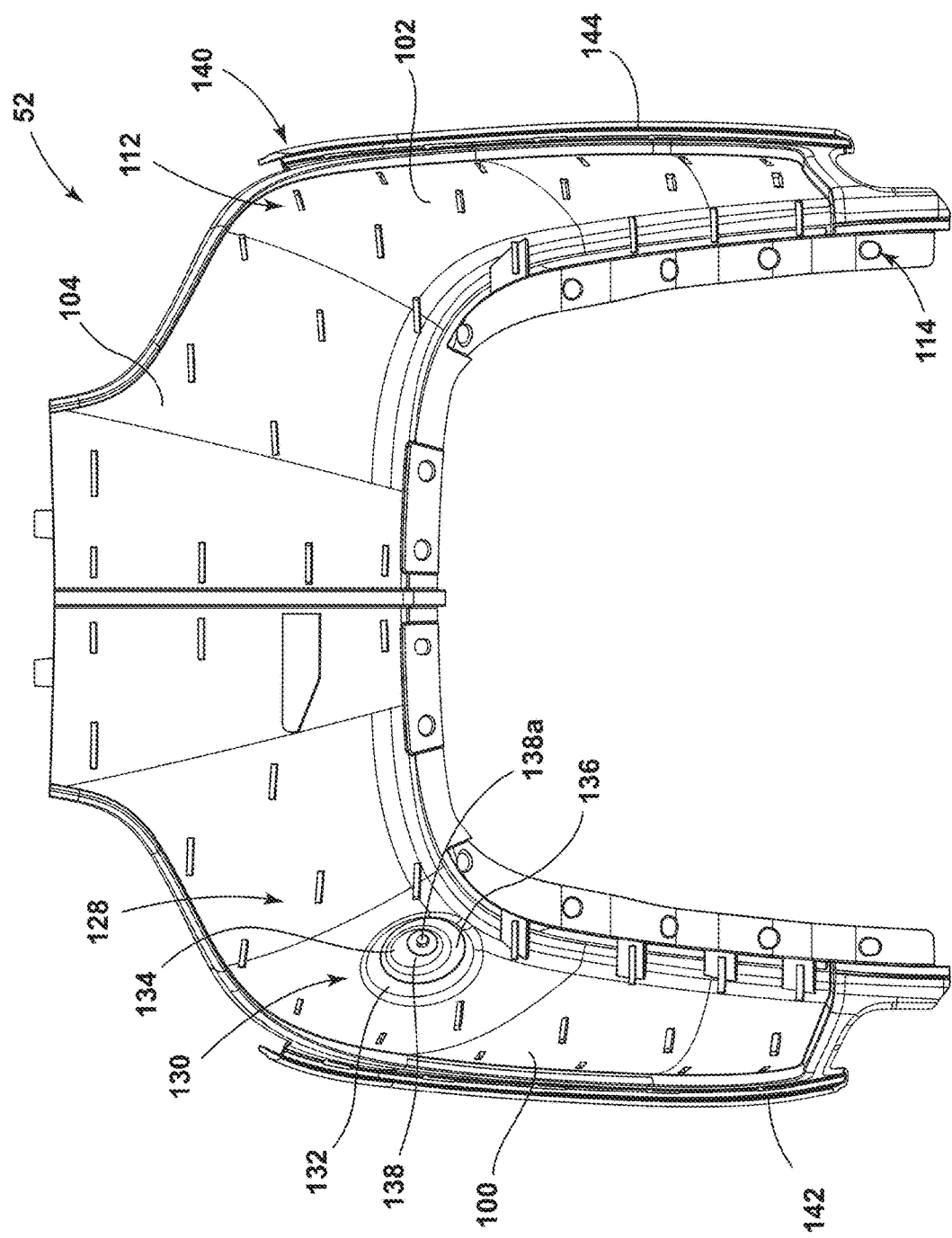
FIG. 5 is a rear perspective view generally illustrating an embodiment of a substrate panel of a seat assembly according to teachings of the present disclosure.

Referring to FIG. 5, a rear view of the substrate panel 52 is illustrated. The tab apertures 112 are disposed along the first leg 100, the second leg 102, and the middle section 104. The stake apertures 114 are disposed along an inner edge of the first leg 100, the second leg 102, and the middle section 104. The substrate panel 52 includes a curved portion 128 and a recess 130 disposed at the first leg 100, the middle section 104, or both (e.g., partially at the first leg 100 and the middle section 104). The recess 130 is provided as a stepped recess including an outer portion 132 and an inner portion 134 separated by a shoulder 136. The inner portion 134 extends forward from the outer portion 132 (e.g., farther into the seat back 24 toward the cushion 62-FIG. 3) The outer portion 132 has a larger inner dimension than the inner portion 134. At least one of the outer portion 132 or the inner portion 134 can be provided as or include a conical portion. The inner portion 134 includes an end wall 138 that defines an aperture 138a (e.g., a through aperture). The recess 130 is disposed at the curved portion 128 such that the opening of the recess 130 is non-planar. For example, the curved portion 128 includes portions of the first leg 100 and/or the middle section 104 that curve, at least some degree, from the rear 82 of the seat back frame 60 (FIG. 3) toward the front 80.

The substrate panel 52 includes a trim attachment channel 140 that extends along the outer edges of the first leg 100 and the second leg 102. For example, a first section 142 of the trim attachment channel 140 extends along the outer edge of the first leg 100 (e.g., a farthest outboard portion of the substrate panel 52), and a second section 144 of the trim attachment channel 140 extends along the outer edge of the second leg 102 (e.g., a farthest inboard portion of the substrate panel 52). The trim cover 64 (FIG. 3) is configured to engage to the first section 142 and the second section 144 to retain the trim cover 64 relative to the cushion 62 (FIG. 3) and the back panel assembly 50.

Figure 6:
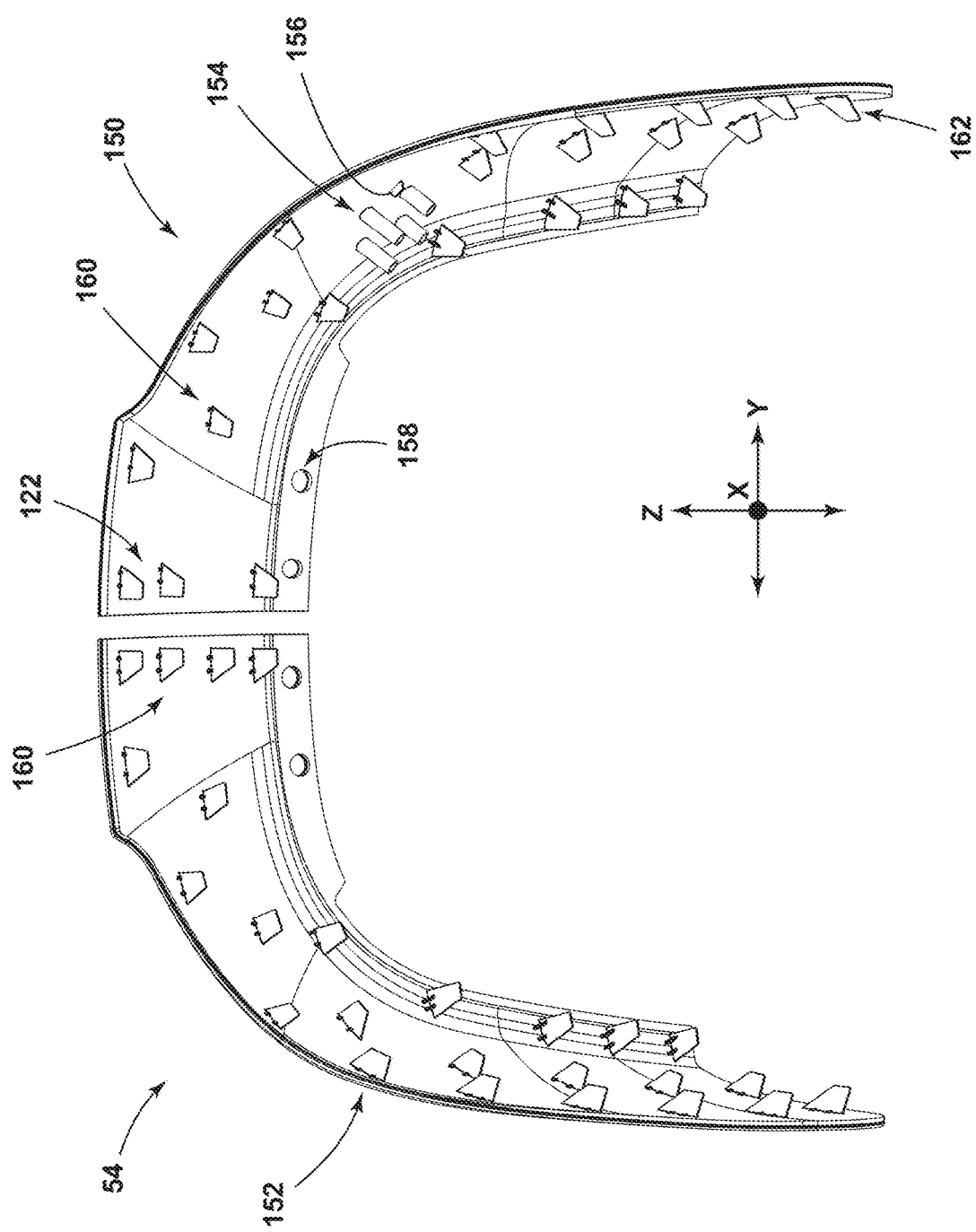
FIG. 6 is a front perspective view generally illustrating an embodiment of an outer panel of a seat assembly according to teachings of the present disclosure.

Referring to FIG. 6, a front perspective view of the outer panel 54 is illustrated. The outer panel 54 includes a first segment 150 and a second segment 152 that are separate components, but the outer panel 54 can be provided as a single component. In the illustrated example, the first segment 150 and the second segment 152 each have L-shaped configurations and are arranged to form a U-shaped configuration that opens downward and corresponds to the shape of the substrate panel 52 (FIG. 5). The first segment 150 includes the weld tabs 122 and a heat stake 154 that extend forward and inward. The heat stake 154 can be provided as a plurality of heat stakes. In the illustrated example, the heat stake 154 includes four heat stakes arranged in a square configuration, but other configurations and numbers of heat stakes can be utilized. The first segment 150 optionally includes an alignment protrusion 156 disposed proximate the heat stake(s) 154. The alignment protrusion 156 is illustrated as a fin extending in a direction parallel to the heat stake(s) 154 (e.g., inward and forward). The outer panel 54 includes a plurality of stake apertures 158 that are disposed along a top inner edge of the first segment 150 and the second segment 152. The weld tabs 122 extend inward from the first segment 150 and the second segment 152 for insertion into respective tab apertures 112 of the substrate panel 52 (FIG. 5). The weld tabs 122 include a first set of weld tabs 160 and a second set of weld tabs 162, with each set including one or more of the weld tabs 122.

Figure 7:
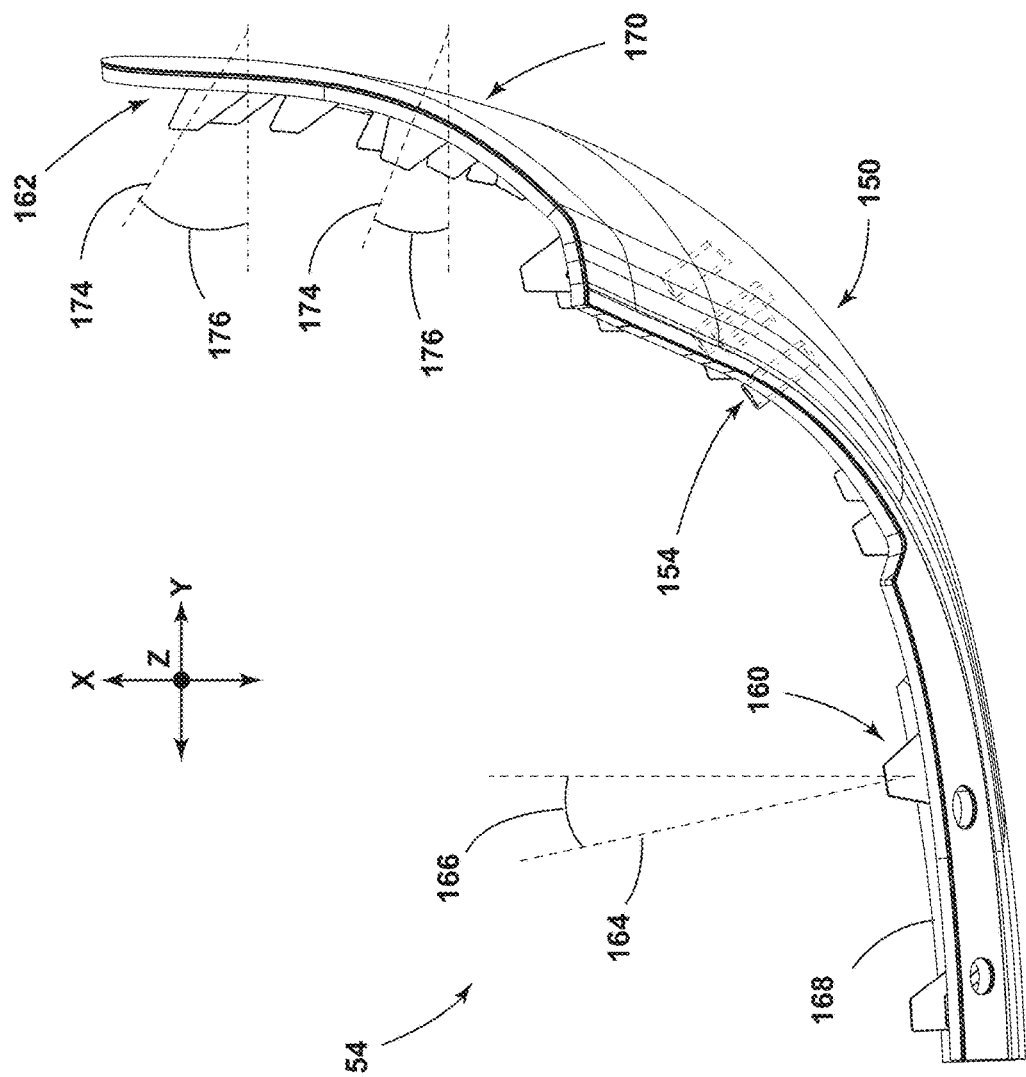
FIG. 7 is a bottom perspective view generally illustrating portions of an embodiment of an outer panel of a seat assembly according to teachings of the present disclosure.

Referring to FIG. 7, the first set of weld tabs 160 extend generally in the longitudinal direction X (e.g., generally forward). For example, centerlines 164 of the first set of weld tabs 160 extend at one or more first angles 166 of greater than or equal to 0 degrees and less than or equal to 30 degrees relative to the longitudinal direction X as viewed in an X-Y plane. For example, the one or more first angles 166 are measured between the longitudinal direction X and the transverse direction Y, irrespective of angling, if any, of the first set of weld tabs 160 relative to the vertical direction Z. At least some of the first set of weld tabs 160 are arranged along a top 168 of the outer panel 54 to engage the middle section 104 of the substrate panel 52 (FIG. 5). At least some of the second set of weld tabs 162 are arranged along a first side 170 of the outer panel 54 that engages the first leg 100 of the substrate panel 52 (FIG. 5). The second set of weld tabs 162 extend closer to parallel with the transverse direction Y than the first set of weld tabs 160. For example, centerlines 174 of the second set of weld tabs 162 extend at one or more second angles 176 of greater than or equal to 0 degrees and less than or equal to 45 degrees relative to the transverse direction as viewed in an X-Y plane. For example, the one or more second angles 176 are measured between the transverse direction Y and the longitudinal direction X, irrespective of angling, if any, of the second set of weld tabs 162 relative to the vertical direction Z.

Figure 8:
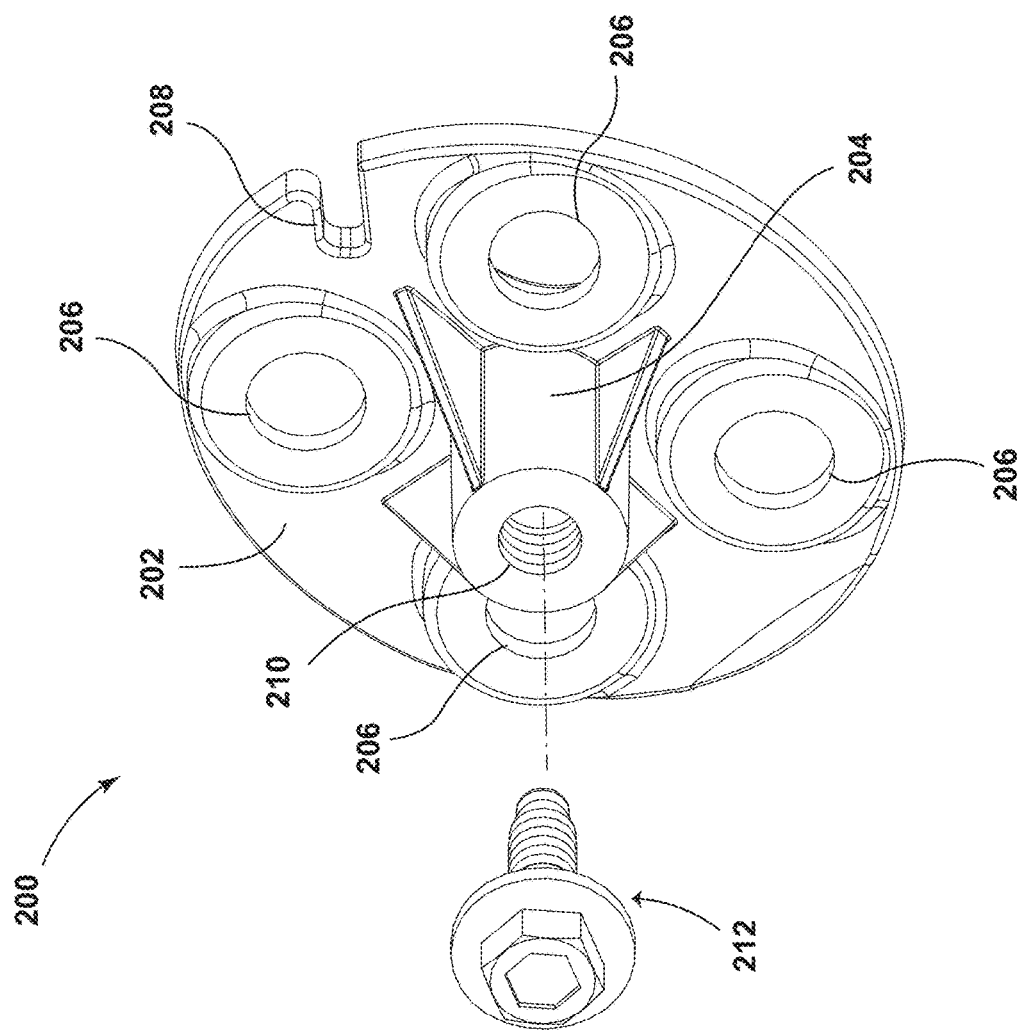
FIG. 8 is a perspective view generally illustrating an embodiment of a retainer and a bolt of a seat assembly according to teachings of the present disclosure.
Figure 9:
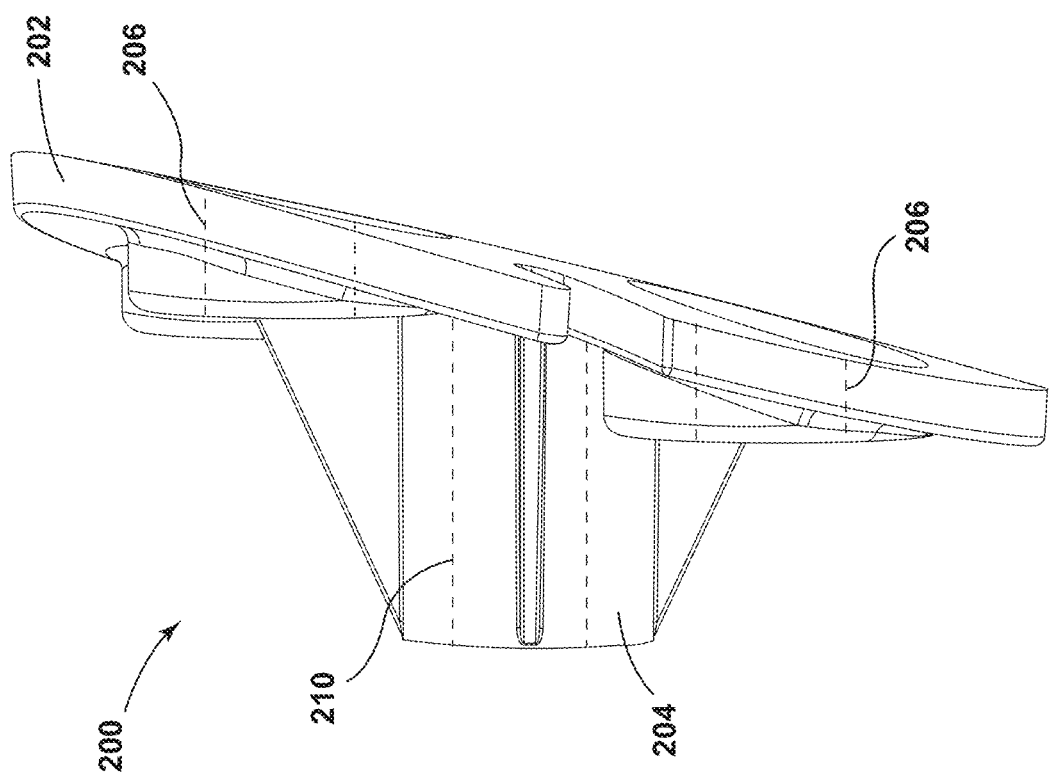
FIG. 9 is a side view generally illustrating an embodiment of a retainer of a seat assembly according to teachings of the present disclosure.

Referring to FIGS. 8 and 9, a retainer 200 is illustrated. The retainer 200 is configured to facilitate and/or increase the robustness of the coupling of the outer panel 54 (e.g., the first segment 150-FIG. 6) with the substrate panel 52 (FIG. 5). The retainer 200 includes a base 202 and a boss 204 extending from the base 202. The base 202 defines an aperture 206, which can be provided as a plurality of apertures. The heat stake(s) 154 of the outer panel 54 (FIG. 6) are configured to engage respective apertures 206. For example, the arrangement of the one or more apertures 206 matches the arrangement of the heat stakes 154 illustrated in FIG. 6 (e.g., four apertures 206 arranged about the boss 204 in a square configuration). The base 202 includes an alignment slot 208 extending inward from an outer edge of the base 202. In an assembled configuration, the alignment protrusion 156 of the outer panel 54 (FIG. 6) extends into the alignment slot 208 to properly align the retainer 200 with the outer panel 54 (FIG. 6).

The boss 204 includes a boss aperture 210 configured to engage a bolt 212 (FIG. 8). For example, the boss aperture 210 can be threaded, a threaded insert can be disposed in the boss aperture 210, or both, to engage threads of the bolt 212. The boss 204 extends from the base 202 away from the outer panel 54 (FIG. 6) for insertion at least partially into the recess 130, such as through the outer portion 132, beyond the shoulder 136, and into the inner portion 134 such that the boss 204 abuts the end wall 138 and the boss aperture 210 is aligned with the aperture 138a of the substrate panel 52 (FIG. 5).

Referring to FIG. 9, the base 202 includes a non-planar configuration. For example, the base 202 is curved to match the curvature of the substrate panel 52 (FIG. 5) and/or the curvature of the first segment 150 of the outer panel 54 (FIG. 6).

Figure 10:
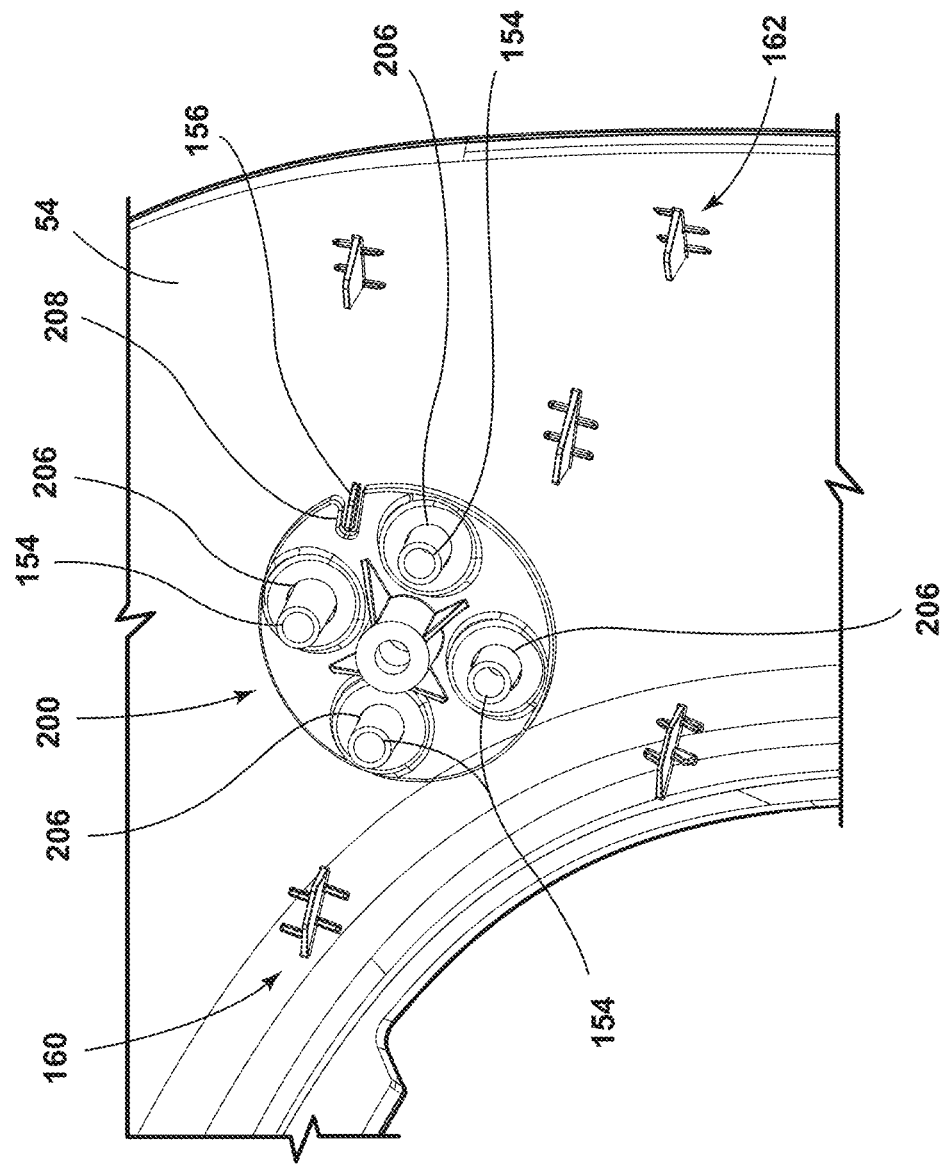
FIG. 10 is a front perspective view generally illustrating portions of an embodiment of an outer panel and a retainer of a seat assembly according to teachings of the present disclosure.

Referring to FIG. 10, a front perspective view shows the retainer 200 engaged with the outer panel 54. The heat stakes 154 of the outer panel 54 extend through the apertures 206. The heat stakes 154 can then be melted to fix the retainer 200 to the outer panel 54. The alignment protrusion 156 of the outer panel 54 is disposed at least partially in the alignment slot 208. The retainer 200 and the heat stakes 154 are shown at a curved portion of the first segment 150 of the outer panel 54. In the illustrated view, weld tabs of the first set of weld tabs 160 are to the left of the retainer 200 and weld tabs of the second set of weld tabs 162 are to the right of the retainer 200.

Figure 11:
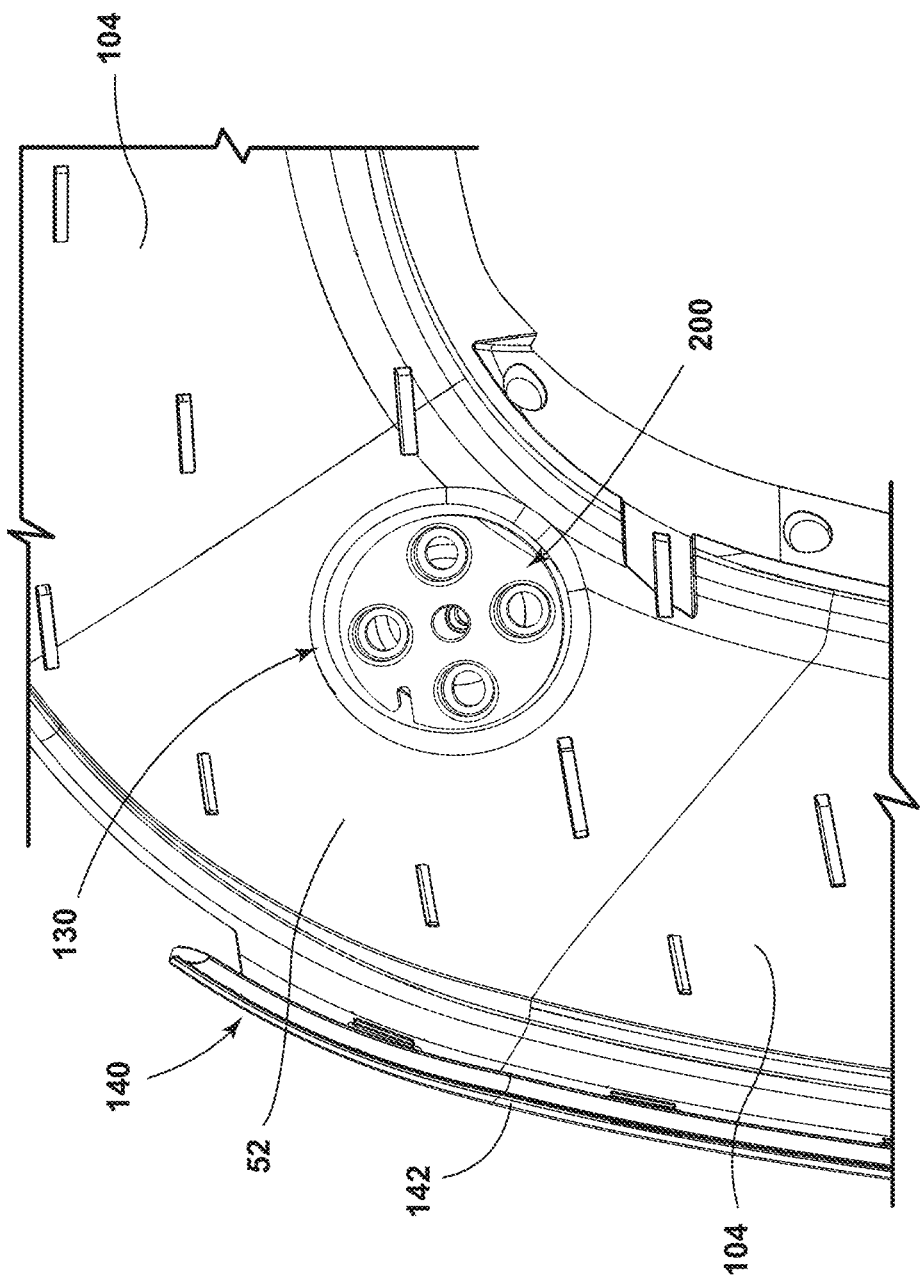
FIG. 11 is a rear perspective view generally illustrating portions of an embodiment of a substrate panel and a retainer of a seat assembly according to teachings of the present disclosure.

Referring to FIG. 11, a rear perspective view shows the retainer 200 disposed in the recess 130. The outer panel 54 is hidden for illustrative purposes. The recess 130 is disposed at a top section of the first leg 100 and/or an outboard section of the middle section 104, with the outboard direction being generally to the left in FIG. 11. The first section 142 of the trim attachment channel 140 is shown at the outer edge of the first leg 100. In the illustrated example, at least a portion of the recess 130 is at a height below a maximum height of the first section 142 of the trim attachment channel 140.

Figure 12:
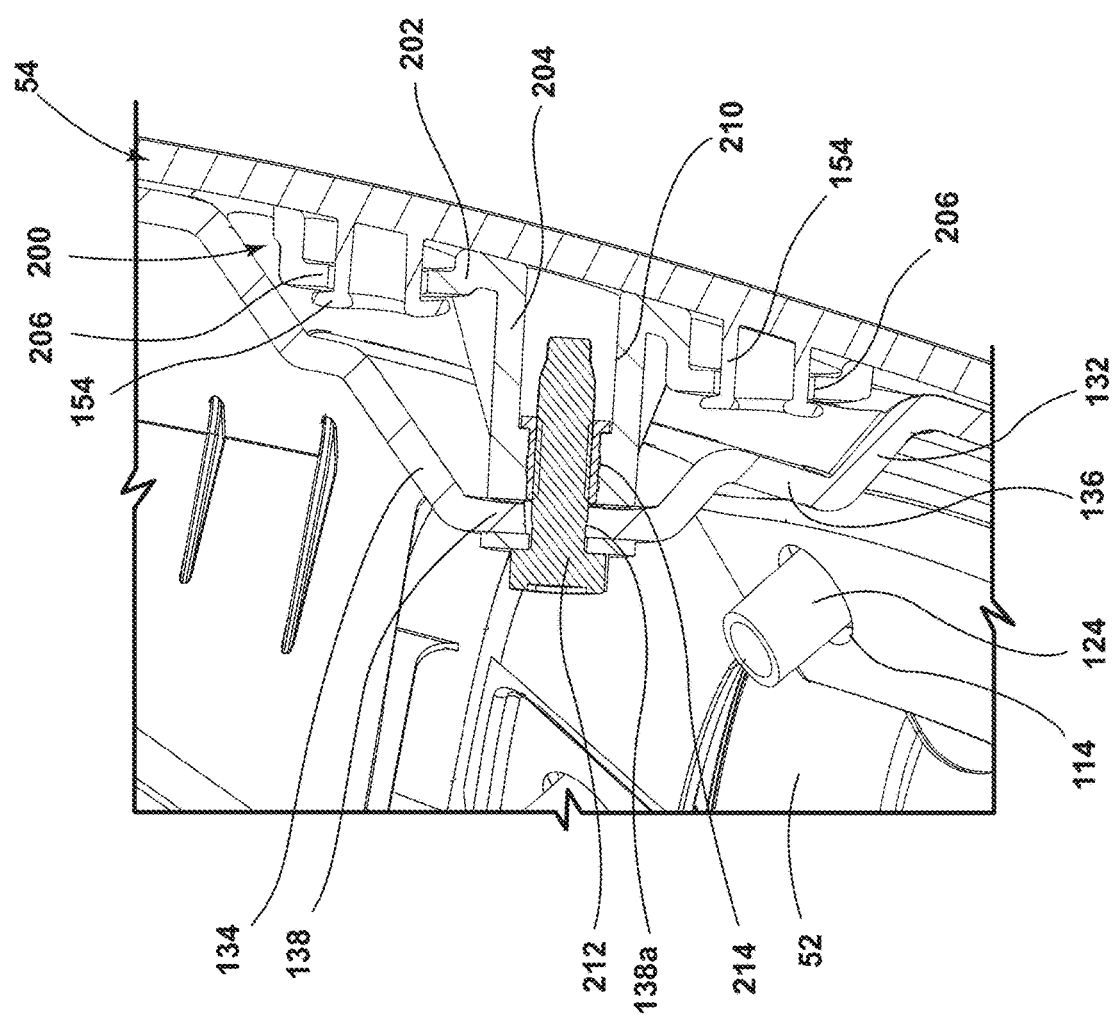
FIG. 12 is a cross-sectional view generally illustrating portions of an embodiment of a back panel assembly of a seat assembly according to teachings of the present disclosure.

Referring to FIG. 12, the retainer 200 is shown coupled with the outer panel 54 and the substrate panel 52 to couple the substrate panel 52 with the outer panel 54, such as in addition to coupling provided by the tab apertures 112 (FIG. 5) and the weld tabs 122 (FIG. 6). The heat stakes 154 of the outer panel 54 extend through the apertures 206 and are melted onto the base 202 to fix the retainer 200 on the outer panel 54. In the illustrated example, the heat stakes 154 are disposed at least partially in the outer portion 132 of the recess 130. The boss 204 is disposed in contact with the end wall 138 such that the boss aperture 210 is aligned with the aperture 138a. The bolt 212 extends through the aperture 138a into the boss aperture 210. In the illustrated example, the retainer 200 includes a threaded insert 214 (e.g., a threaded metal insert) disposed at least partially in the boss aperture 210 and threadedly engaged with the bolt 212. Optionally, the boss 204 is overmolded on the threaded insert 214. The threaded engagement of the bolt 212 with the retainer 200 couples (e.g., fixes) the retainer 200 with the substrate panel 52, which couples the substrate panel 52 with the outer panel 54.

Figure 13:
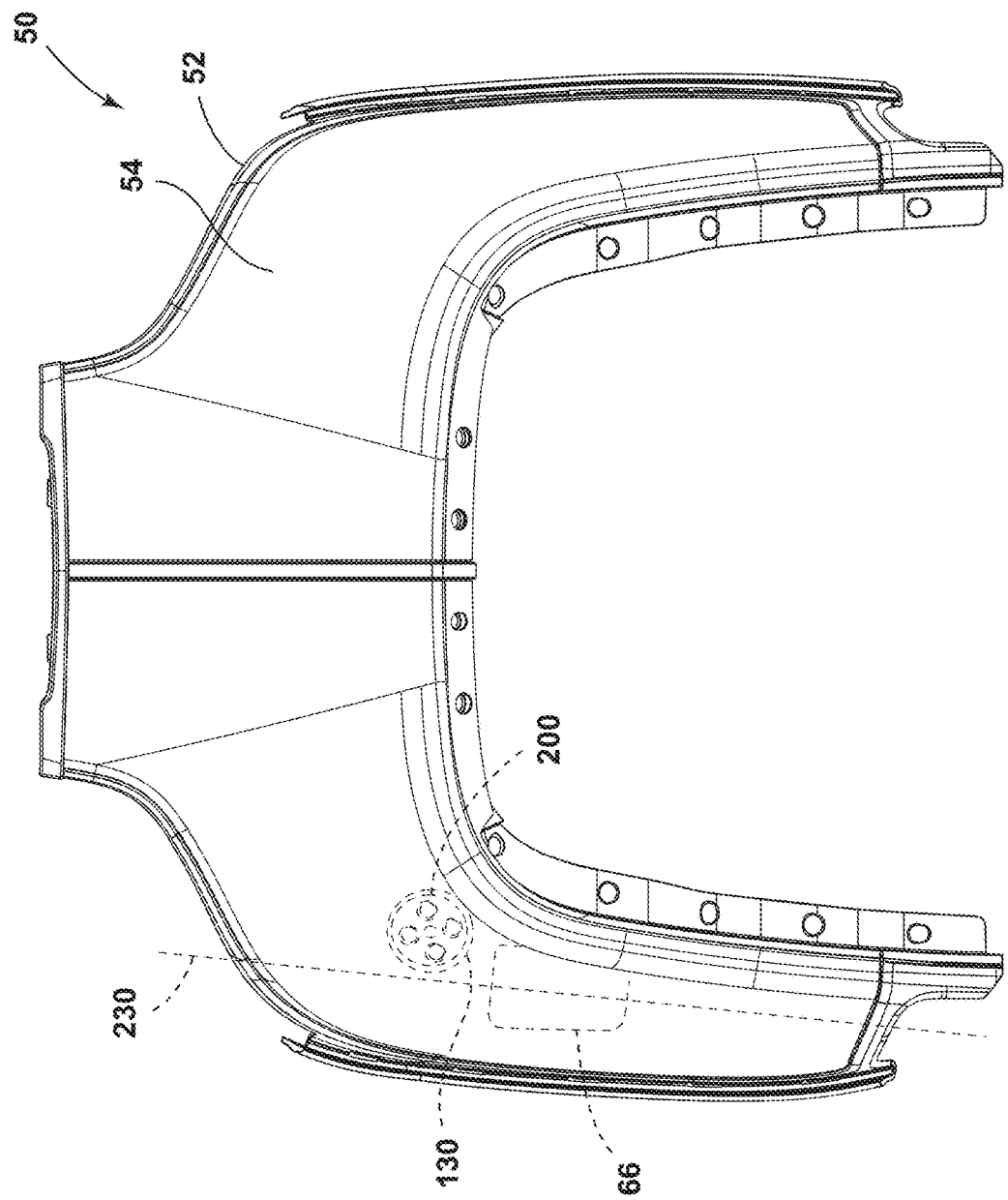
FIG. 13 is a rear perspective view generally illustrating portions of an embodiment of a back panel assembly of a seat assembly according to teachings of the present disclosure.
Figure 14:
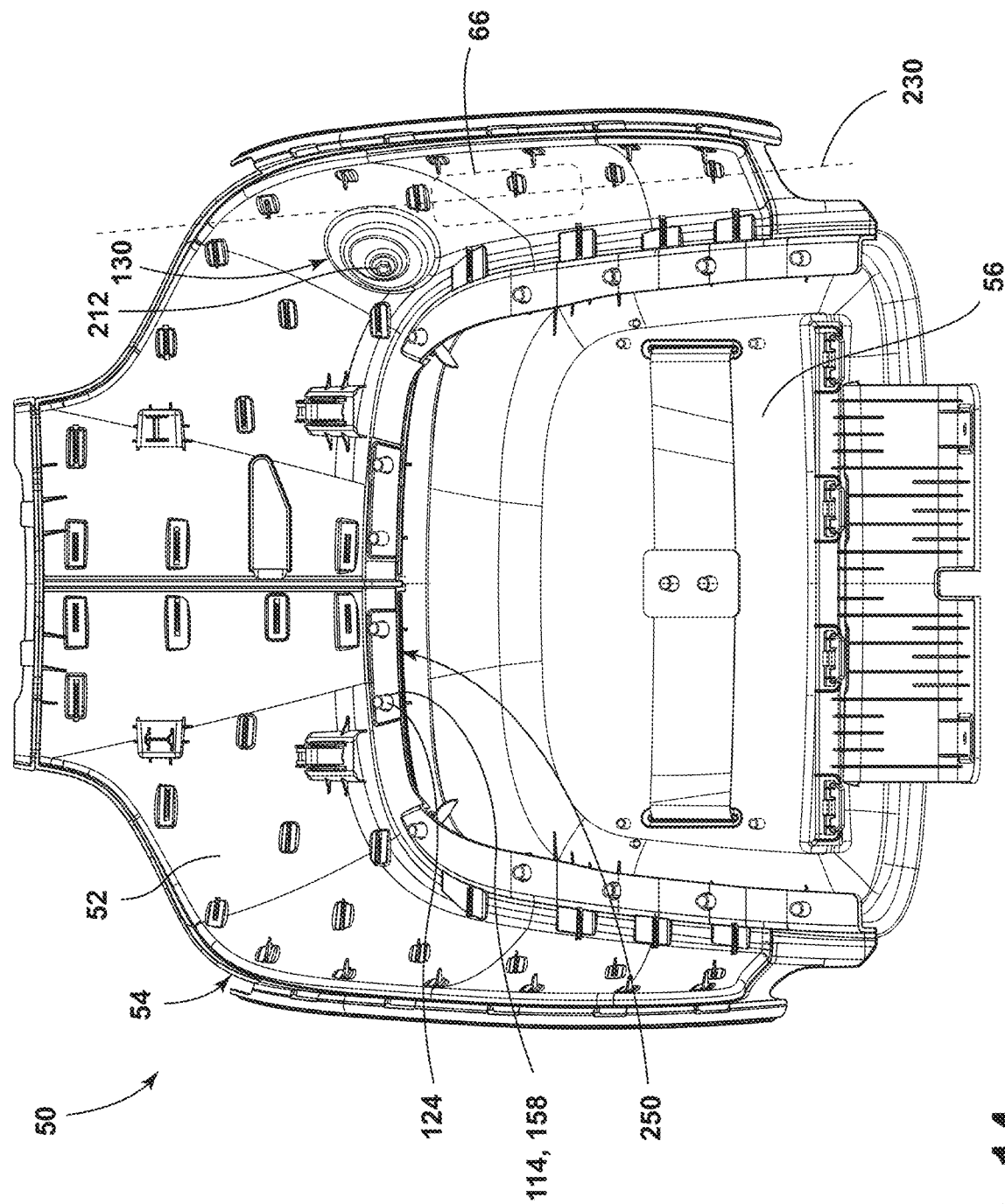
FIG. 14 is a front perspective view generally illustrating portions of an embodiment of a back panel assembly of a seat assembly according to teachings of the present disclosure.

The coupling provided by the retainer 200 is in addition to the coupling provided by the tab apertures 112 (FIG. 5) and the weld tabs 122 (FIG. 6), and is provided proximate the airbag 66 to facilitate maintaining the position or limiting movement of the outer panel 54 during deployment of the airbag 66. For example, as generally illustrated in FIGS. 13 and 14, the back panel assembly 50 defines an airbag deployment bending axis 230. During deployment of the airbag 66, forces generated by the airbag 66 are applied to the back panel assembly 50, including the substrate panel 52 and the outer panel 54, such that at least one of the substrate panel 52 or the outer panel 54 bend, at least to some degree, about the airbag deployment bending axis 230. The retainer 200 limits movement of the outer panel 54 relative to the substrate panel 52 during such deployment. Additionally or alternatively, the retainer 200 limits shear strain applied to at least some of the weld tabs 122. For example, deployment of the airbag 66 can apply forces generally in the transverse direction Y, which can apply shear strain to at least some of the first set of weld tabs 160 (FIG. 7), and the retainer 200 limit such shear strain. The second set of weld tabs 162 (FIG. 7) are closer to aligned with the deployment direction of the airbag 66, so more of the strain is applied to the second set of weld tabs 162 as longitudinal strain, to which the weld tabs 122 may have a greater resistance. For example, the first set of weld tabs 160 may have less resistance to the strain applied by airbag deployment, and the retainer 200 can, at least indirectly, reinforce the first set of weld tabs 160. In the illustrated example, the retainer 200 and the recess 130 are disposed above the airbag 66, and the airbag deployment bending axis 230 intersects with the recess 130 and/or the retainer 200.

Figure 15:
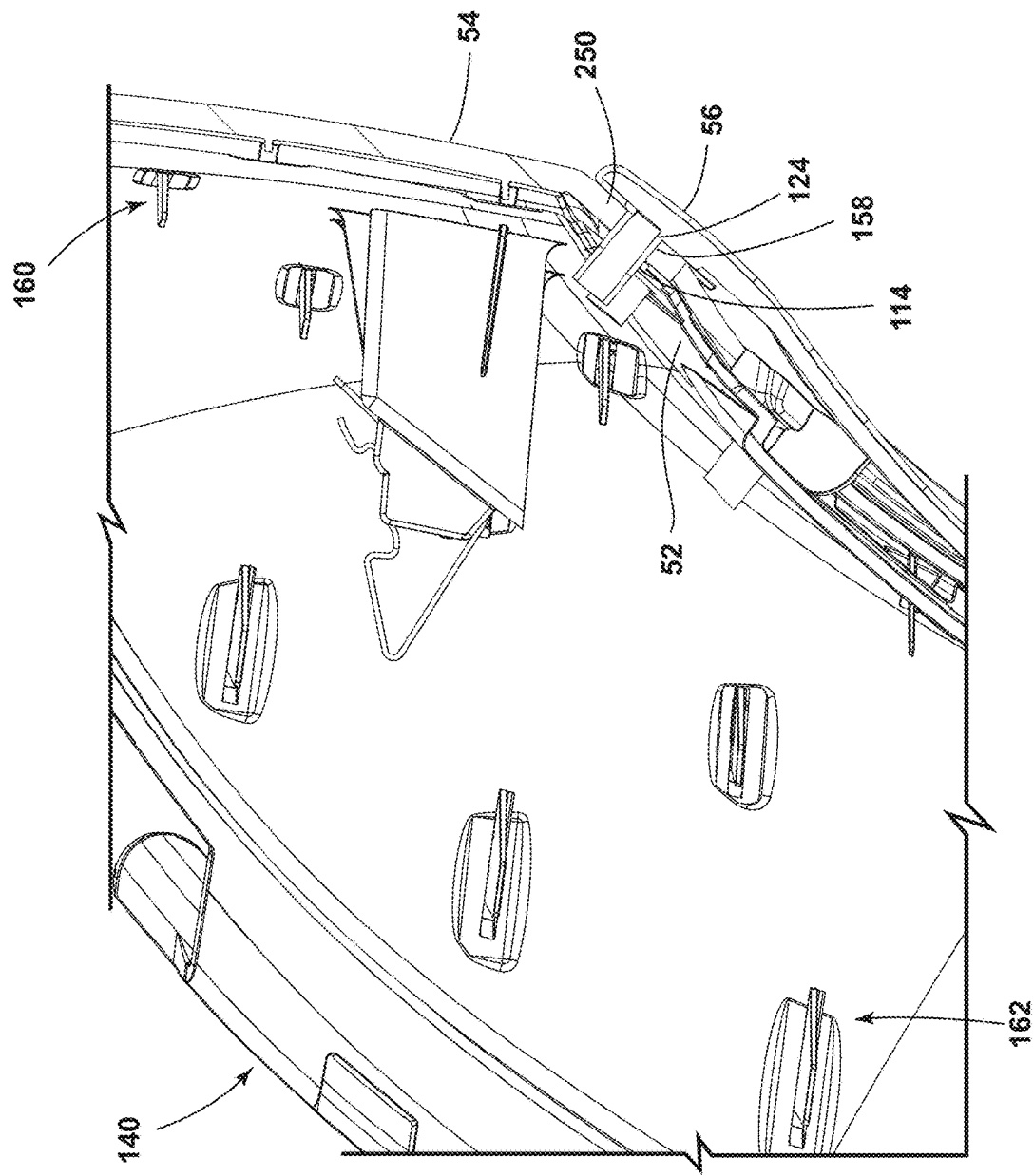
FIG. 15 is a cross-sectional view generally illustrating portions of an embodiment of a back panel assembly of a seat assembly according to teachings of the present disclosure.

Regarding FIGS. 14 and 15, the map pocket 56 is shown as engaged with the substrate panel 52 and the outer panel 54 of the back panel assembly 50. For example, the heat stakes 124 of the map pocket 56 extend through the stake apertures 114 of the substrate panel 52, and at least some of the heat stakes 124 also extend through the stake apertures 158 of the outer panel 54. For example, the map pocket 56 is assembled with the substrate panel 52 and the outer panel 54 such that a portion 250 of the outer panel 54 is disposed between (e.g., directly between and in contact with) the substrate panel 52 and the map pocket 56. Such an overlapping configuration clamps the portion 250 of the outer panel 54 between the substrate panel 52 and the map pocket 56 to further limit movement of the outer panel 54 relative to the substrate panel 52, such as during deployment of the airbag 66 (FIG. 14). The portion 250 is illustrated as extending along a top of an inner edge of the outer panel 54, but can, additionally or alternatively, extend along the sides of the inner edge.

The instant disclosure includes the following non-limiting embodiments:

A seat assembly, comprising: a seat back comprising: a cushion; a back panel assembly, including: a substrate panel; an outer panel coupled to the substrate panel via a plurality of protrusions of at least one of the outer panel or the substrate panel; a retainer coupled to the substrate panel and the outer panel; a trim cover engaged with the back panel assembly and covering at least a portion of the cushion; and an airbag disposed at least partially between the outer panel and the trim cover; wherein the retainer is configured to limit movement of the outer panel during deployment of the airbag.

The seat assembly of any preceding embodiment, wherein the substrate panel comprises a stepped recess; and the retainer is disposed at least partially in the stepped recess.

The seat assembly of any preceding embodiment, wherein the stepped recess includes a conical portion.

The seat assembly of any preceding embodiment, wherein the outer panel includes an alignment protrusion extending into an alignment slot of the retainer.

The seat assembly of any preceding embodiment, further comprising a bolt; wherein the retainer includes a threaded boss; and the bolt extends through the substrate panel and is engaged with the threaded boss.

The seat assembly of any preceding embodiment, wherein the outer panel includes a heat stake extending through an aperture of the retainer.

The seat assembly of any preceding embodiment, wherein the outer panel includes a plurality of heat stakes extending through respective apertures of the retainer.

The seat assembly of any preceding embodiment, wherein the retainer includes a base defining the respective apertures; the threaded boss extends from the base; the substrate panel includes a stepped recess including an outer portion and an inner portion separated by a shoulder, the outer portion having a larger inner dimension than the inner portion; the threaded boss is disposed at least partially in the inner portion; and the base and the plurality of heat stakes are disposed at least partially in the outer portion.

The seat assembly of any preceding embodiment, wherein the back panel assembly defines an airbag deployment bending axis that intersects the retainer.

The seat assembly of any preceding embodiment, wherein the outer panel comprises the plurality of protrusions; and the plurality of protrusions comprises a plurality of weld tabs extending through respective tab apertures of the substrate panel to couple the outer panel with the substrate panel separately from the retainer.

The seat assembly of any preceding embodiment, wherein the plurality of weld tabs includes a first set of weld tabs and a second set of weld tabs; the seat assembly defines a longitudinal direction and a transverse direction; the first set of weld tabs extend at first angles of greater than or equal to 0 degrees and less than or equal to 30 degrees relative to the longitudinal direction; the second set of weld tabs extend at second angles of greater than or equal to 0 degrees and less than or equal to 45 degrees relative to the transverse direction; and the retainer is configured to limit shear strain applied to the first set of weld tabs.

The seat assembly of any preceding embodiment, wherein the retainer is configured to limit shear strain applied to the first set of weld tabs during deployment of the airbag.

The seat assembly of any preceding embodiment, wherein the trim cover includes a breakaway section through which the airbag is configured to deploy.

The seat assembly of any preceding embodiment, wherein the retainer is above the airbag.

The seat assembly of any preceding embodiment, further comprising a map pocket coupled to the outer panel and the substrate panel.

The seat assembly of any preceding embodiment wherein the map pocket comprises a map pocket heat stake extending through the outer panel and the substrate panel.

The seat assembly of any preceding embodiment, wherein a portion of the outer panel is disposed between and in contact with the map pocket and the substrate panel; and the map pocket heat stake extends through the portion of the outer panel.

The seat assembly of any preceding embodiment, wherein the substrate panel includes a trim attachment channel; and the trim cover is engaged with the trim attachment channel.

The seat assembly of any preceding embodiment, wherein the seat back further comprises a seat back frame; the substrate panel and the cushion are coupled to the seat back frame; the back frame includes a front, a rear, a first side, and a second side; the substrate panel and the outer panel are disposed at the rear of the back frame and extend forward along at least a portion of the first side and the second side; the trim attachment channel includes a first section disposed at the first side and a second section disposed at the second side; and the trim cover is engaged with the first section and the second section of the trim attachment channel.

The seat assembly of any preceding embodiment, wherein the substrate panel and the outer panel comprise U-shaped configurations that open downward.

A vehicle comprising the seat assembly of any preceding embodiment.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof. The word "exemplary" is used herein to mean "serving as a non-limiting example."

It should be understood that references to a single element are not necessarily so limited and may include one or more of such element, unless the context clearly indicates otherwise. A "set" of elements can include any number of one or more elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above. The term "at least one of" in the context of, e.g., "at least one of A, B, and C" or "at least one of A, B, or C" includes only A, only B, only C, or any combination or subset of A, B, and C, including any combination or subset of one or a plurality of A, one or a plurality of B, and one or a plurality of C.

Although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. The term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A seat assembly, comprising:
   a seat back comprising:
      a cushion;
      a back panel assembly, including:
         a substrate panel;
         an outer panel coupled to the substrate panel via a plurality of protrusions of at least one of the outer panel or the substrate panel;
         a retainer coupled to the substrate panel and the outer panel;
      a trim cover engaged with the back panel assembly and covering at least a portion of the cushion; and
      an airbag disposed at least partially between the outer panel and the trim cover;
   wherein the retainer is configured to limit movement of the outer panel during deployment of the airbag.

2. The seat assembly of claim 1, wherein the substrate panel comprises a stepped recess; and
   the retainer is disposed at least partially in the stepped recess.

3. The seat assembly of claim 2, wherein the stepped recess includes a conical portion.

4. The seat assembly of claim 1, wherein the outer panel includes an alignment protrusion extending into an alignment slot of the retainer.

5. The seat assembly of claim 1, further comprising a bolt;
   wherein the retainer includes a threaded boss; and
   the bolt extends through the substrate panel and is engaged with the threaded boss.

6. The seat assembly of claim 5, wherein the outer panel includes a heat stake extending through an aperture of the retainer.

7. The seat assembly of claim 5, wherein the outer panel includes a plurality of heat stakes extending through respective apertures of the retainer.

8. The seat assembly of claim 7, wherein the retainer includes a base defining the respective apertures;
   the threaded boss extends from the base;
   the substrate panel includes a stepped recess including an outer portion and an inner portion separated by a shoulder, the outer portion having a larger inner dimension than the inner portion;
   the threaded boss is disposed at least partially in the inner portion; and the base and the plurality of heat stakes are disposed at least partially in the outer portion.

9. The seat assembly of claim 1, wherein the back panel assembly defines an airbag deployment bending axis that intersects the retainer.

10. The seat assembly of claim 1, wherein the outer panel comprises the plurality of protrusions; and
the plurality of protrusions comprises a plurality of weld tabs extending through respective tab apertures of the substrate panel to couple the outer panel with the substrate panel separately from the retainer.

11. The seat assembly of claim 10, wherein the plurality of weld tabs includes a first set of weld tabs and a second set of weld tabs;
the seat assembly defines a longitudinal direction and a transverse direction;
the first set of weld tabs extend at first angles of greater than or equal to 0 degrees and less than or equal to 30 degrees relative to the longitudinal direction;
the second set of weld tabs extend at second angles of greater than or equal to 0 degrees and less than or equal to 45 degrees relative to the transverse direction; and
the retainer is configured to limit shear strain applied to the first set of weld tabs.

12. The seat assembly of claim 11, wherein the retainer is configured to limit shear strain applied to the first set of weld tabs during deployment of the airbag.

13. The seat assembly of claim 12, wherein the trim cover includes a breakaway section through which the airbag is configured to deploy.

14. The seat assembly of claim 13, wherein the retainer is above the airbag.

15. The seat assembly of claim 1, further comprising a map pocket coupled to the outer panel and the substrate panel.

16. The seat assembly of claim 15, wherein the map pocket comprises a map pocket heat stake extending through the outer panel and the substrate panel.

17. The seat assembly of claim 16, wherein a portion of the outer panel is disposed between and in contact with the map pocket and the substrate panel; and
the map pocket heat stake extends through the portion of the outer panel.

18. The seat assembly of claim 1, wherein the substrate panel includes a trim attachment channel; and
the trim cover is engaged with the trim attachment channel.

19. The seat assembly of claim 18, wherein the seat back further comprises a seat back frame;
the substrate panel and the cushion are coupled to the seat back frame;
the back frame includes a front, a rear, a first side, and a second side;
the substrate panel and the outer panel are disposed at the rear of the back frame and extend forward along at least a portion of the first side and the second side;
the trim attachment channel includes a first section disposed at the first side and a second section disposed at the second side; and
the trim cover is engaged with the first section and the second section of the trim attachment channel.

20. The seat assembly of claim 1, wherein the substrate panel and the outer panel comprise U-shaped configurations that open downward.

* * * * *